May 10, 1932.  T. OKUMURA  1,857,324
SPEED CHANGING APPARATUS
Filed Aug. 15, 1928  2 Sheets-Sheet 2
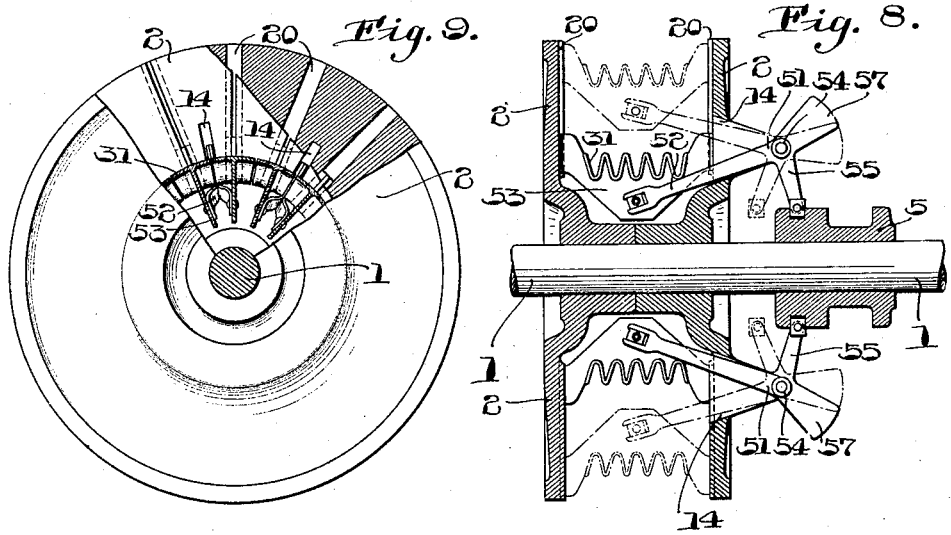
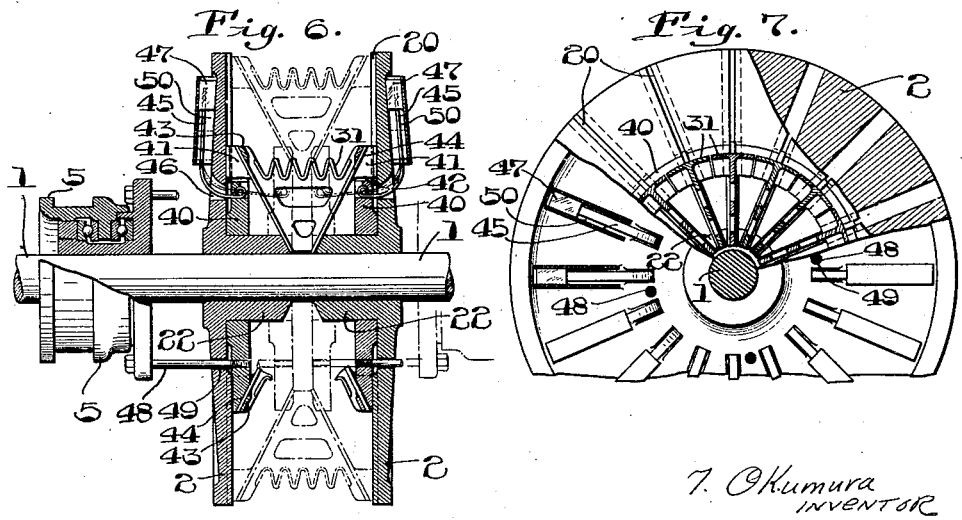
T. Okumura
INVENTOR
By: Marks & Clerk
ATTYS.

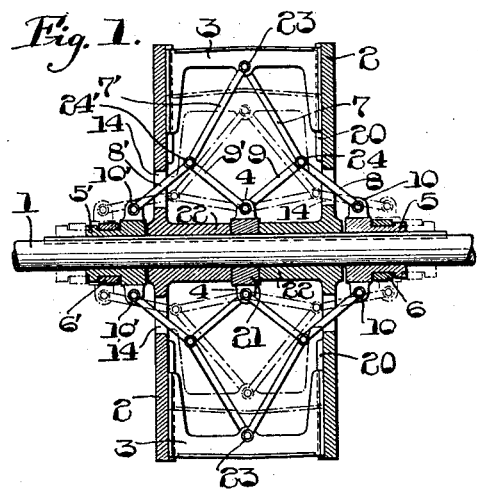

Patented May 10, 1932

1,857,324

UNITED STATES PATENT OFFICE

TAKESHI OKUMURA, OF KAMIKYO KU, KYOTO, JAPAN

SPEED CHANGING APPARATUS

Application filed August 15, 1928, Serial No. 299,822, and in Japan August 19, 1927.

This invention relates to a speed changing apparatus comprising a plurality of rim units arranged slidably along radial slots of a pair of discs which are mounted on the driven shaft in such a manner as to slide along but to rotate together with said shaft. It is also provided with the means to cause all the rim units to move to its outer or inner position, thus enlarging or diminishing the diameter of the pulley formed by said rim units.

The apparatus has also balancing means which, when the diameter of the driven pulley is diminished and consequently the speed is increased, balances or absorbs the side thrust on the bearings due to the increased speed.

A primary object of this invention is to obtain a speed changing apparatus which, in spite of the constant speed of the driving shaft, enables even unskilled hand to change the driven speed at full range from the minimum to the maximum by an easy and rapid manipulation.

The other object of this invention is to obtain a simple and effective means for balancing the side thrust due to the increasing speed and for preventing the damage of the bearings and their associated parts, so that the machine may keep a long life.

The accompanying drawings show diagrammatically an example of the constructions according to this invention, but it is clear that the invention is not limited to such a construction.

In the drawings,

Fig. 1 is a sectional elevation of the apparatus according to this invention;

Fig. 2, a side view of the same;

Fig. 3, a diagrammatic view showing the driving connection;

Fig. 4, a sectional elevation of a modification of the apparatus having balancing means;

Fig. 5, a side view of the same partly cut off;

Fig. 6, a sectional elevation of another modification;

Fig. 7 is a side view of the same partly cut off;

Fig. 8, the sectional elevation of another modification;

Fig. 9, a side view of the same with its upper half cut off.

Fig. 10 is a plan view of one of the bell crank levers.

Referring to Figs. 1 and 2, 2 is a pair of circular discs mounted oppositely on the driven shaft 1 to rotate together with it 3 is a rim unit mounted on the inner opposite surfaces of a pair of discs 2 and slidable along the opposite radial grooves 20. A ring or collar 21 is mounted between the hubs 22 of the rotating discs 2 and provided on its periphery with lugs 4 each of which is connected by links 9, 9' and 7, 7' with a central pivot 23 on a rim unit 3. The joints 24 and 24' between the links 7, 9, and 7', 9' are connected by links 8 and 8' with a pair of lugs 10, 10' each of which is on the side bearings 5 and 5', through the openings 14 of the discs 2. Rings 6 and 6' are mounted on the bearings 5 and 5' to enable the bearings to be shifted axially on the shaft 1 by any suitable means associated with said rings.

Fig. 3 shows the mode of driving the driven shaft 1 from the driving shaft 30. The endless belt 15 connecting the driving pulley 29 on the shaft 30 with the driven pulley according to this invention (upon the driven shaft 1) is tightened by a tension device consisting of a pressing roller 12 and a weight 13 each mounted on a lever so that the change of the diameter of the driven pulley does not affect the tension of the belt.

In this form of the invention, the diameter of the driven pulley may be changed in a wide range from the maximum to the minimum by shifting the bearings 5 and 5' from their innermost to outermost position by rings 6 and 6' and other suitable means. Consequently, the speed of the driven shaft and its associated parts may be changed widely only by a shifting operation of the bearings without changing the speed and diameter of the driving part.

In the embodiment shown in Figs. 4 and 5, a pair of discs 2 is so formed as to have conical surfaces at their opposite inner surfaces, on which a plurality of radial guide grooves 20 are cut or formed. An inclined leg 32 at either side of the rim unit 31 is inserted in a guide groove 20 so as to slide along it.

A plurality of bearings 33 are fixed on or formed integrally with the inner lower face of the disc 2. On each bearing 33 a link 34 is pivoted to swing radially. With the free ends of a pair of links 34 is connected a balancing weight 35 which has a central aperture 38 and can be moved into or out radially along a guide rod 37 fixed to the periphery of a ring 36 mounted on the shaft 1 midway between the discs 2.

Shifting the bearings 5 inwardly and thus bringing the discs 2 closer, all the rim units 31 are moved outwardly at the same time and the same rate, increasing the diameter of the driven pulley constructed by said rim units. In this case, the balancing weight 35 is moved toward the central axis by the downward swing of the links 34. Thus, when the diameter of the driven pulley is increased and consequently the speed reduced, the centrifugal action of the rim units exerts little thrust which may be neglected accordingly. In this case, balancing weights 38 are close to the axis. Its centrifugal action due to the rotation of the shaft 1 is also small and has no appreciable effect. However, if the diameter of the pulley is reduced by parting the discs 2 and consequently the speed of rotation is increased, the balancing weight 38 comes out radially along the guide rod 37. Then, the centrifugal action of the rim units tends to exert great lateral thrusts on bearings, but at the same time the centrifugal action of the balancing weight 38 which also increases materially in this case, balances or equalizes the thrust, thus preventing the thrust from damaging the bearings.

In the embodiment shown in Figs. 6 and 7, a rim unit 31 shown to form a rope pulley is guided slidably along the radial grooves 20 of the rotating discs 2 arranged and mounted on the driven shaft 1 in the same way as illustrated in Figs. 1 and 2. The arm of the rim unit 31 has side flanges 44 converging toward the shaft 1, and the side legs 41 extending into the guide grooves 20 on the discs 2. A pair of siding discs 40 is slidably mounted upon the hubs 22 of the outer rotating discs 2. The sliding disc 40 has an aperture 42 for each side leg 41 to pass through and an inclined guide face 43 which engages with the inclined flange 44 of the arm of a rim unit 31.

On the outer surface of a disc 2 a plurality of pockets 50 are arranged radially. A sliding weight 47 is slidably guided in each pocket 50, it being connected by a flexible band 45 with the sliding disc 40 through the opening 46 cut through the outer disc 2. The sliding disc 40 is connected with the bearing 5 by several bolts 48 passing through the apertures 49 in the outer disc 40.

If the bearings 5 are shifted inwardly, the sliding discs 40 come close to each other, pushing the rim units 31 outwardly along the guide grooves on the discs 2, and permitting the weights 47 to fall along the pockets 50. Thus, with the increased diameter of the driven rope pulley and the diminished speed of rotation, the thrust due to the rotation of the pulley is small and the balancing weights 47 have little effects. When the sliding discs 40 are shifted apart and the rim units are moved inwardly as shown by full lines, the speed of rotation of the diminished pulley is considerably increased, producing material thrusts on the bearings. In this case, however, the balancing weights 47 are pushed outwardly and the inertia of these weights is sufficiently increased to equalize the objectionable thrusts.

In another embodiment shown in Figs. 8, 9, and 10, a plurality of rim units 31 are mounted slidably along the radial grooves of the inner surfaces of a pair of opposedly-arranged rotating discs 2 in the same way as already shown in Figs. 1 and 2.

Referring to Figs. 8 to 10, 51 is a bell crank lever one end of which is inserted through rectangular radial hole 14. The arm 52 of the lever 51 extending inwardly through said hole is bi-furcated as shown in Fig. 10, the bi-furcated arms being pivoted to arms 53 of two adjacent rim units 31. The lever 51 is pivoted to a stationary shaft 54. The other arm 55 of the lever is connected with a bearing 5. The bell crank lever 51 is loaded with a balancing weight 57 on its shoulder.

When the rim units 31 are moved outwardly and take the position shown by dotted lines in Fig. 8, the speed of rotation is minimum and the centrifugal force exerting axial thrusts are very small. In this case, bell crank lever 51 comes to the position also shown by dotted lines and the balancing weight 57 comes close to the shaft 1. When the diameter of the pulley is reduced to that shown by full lines, the rotation of the pulley considerably increases, causing the side thrust materially to increase. As the bell crank lever 51 now swings to the position shown by full lines and the balancing weight 57 moves away further from the shaft 1, the centrifugal action of the weight increases rapidly and sufficiently equalizes the side thrusts caused by the rapid rotation of the pulley.

I claim:

1. Speed changing apparatus comprising a plurality of rim units slidably engaged in radial slots of a pair of opposed discs rotatable on a rotating shaft, a ring fixed to the shaft, guide rods fixed to the ring, balancing weights slidably guided on said rods, and links pivotally connecting the weights and discs.

2. Speed changing apparatus comprising opposed discs rotatable on a rotating shaft, rim units slidable radially between the discs, means for shifting the rim units radially of the shaft, radial guides associated with the discs, weights slidably guided by the guides, the radial thrust of the rim units being counteracted by the centrifugal force of the weights.

In testimony whereof I have affixed my signature.

TAKESHI OKUMURA.